(12) United States Patent
Eavenson, Sr. et al.

(10) Patent No.: US 7,506,494 B2
(45) Date of Patent: Mar. 24, 2009

(54) PIVOT-BLADE CUTTING AND RETAINING MEANS FOR ROTARY MOWERS

(75) Inventors: Jimmy N. Eavenson, Sr., Aurora, OH (US); Joel Stevens, Stow, OH (US); Dan Morse, Burbank, OH (US)

(73) Assignee: Commercial Turf Products, Ltd., Streetsboro, OH (US)

( * ) Notice: Subject to any disclaimer, the term of this patent is extended or adjusted under 35 U.S.C. 154(b) by 124 days.

(21) Appl. No.: 11/328,857

(22) Filed: Jan. 10, 2006

(65) Prior Publication Data

US 2006/0156706 A1 Jul. 20, 2006

Related U.S. Application Data

(60) Provisional application No. 60/644,550, filed on Jan. 18, 2005.

(51) Int. Cl.
*A01D 34/00* (2006.01)
(52) U.S. Cl. .............. 56/17.5; 56/255; 56/295
(58) Field of Classification Search ........... 56/255, 56/289, 17.5, 295, DIG. 17, DIG. 20
See application file for complete search history.

(56) References Cited

U.S. PATENT DOCUMENTS

| | | | | |
|---|---|---|---|---|
| 2,889,677 A | * | 6/1959 | Wood | 56/295 |
| 3,320,733 A | * | 5/1967 | Kirk | 56/295 |
| 3,835,630 A | | 9/1974 | von der Au | |
| 3,918,241 A | * | 11/1975 | Stillions | 56/12.7 |
| 4,112,653 A | * | 9/1978 | Ballas et al. | 56/12.7 |
| 4,502,271 A | | 3/1985 | Hansen et al. | |
| 5,117,616 A | * | 6/1992 | McLane | 56/17.5 |
| 5,129,217 A | | 7/1992 | Loehr | |
| 5,133,176 A | | 7/1992 | Baumann et al. | |
| 5,205,112 A | | 4/1993 | Tillotson et al. | |
| 5,305,589 A | | 4/1994 | Rodriguez et al. | |
| 5,341,629 A | | 8/1994 | Penner | |
| 5,622,035 A | * | 4/1997 | Kondo et al. | 56/12.7 |
| 5,628,171 A | | 5/1997 | Stewart et al. | |
| 5,724,796 A | | 3/1998 | Plamper | |
| 5,884,463 A | * | 3/1999 | Darzinskis | 56/13.4 |
| 6,052,907 A | * | 4/2000 | Wang | 30/276 |
| 6,055,798 A | * | 5/2000 | Fulmer et al. | 56/12.7 |
| 6,067,783 A | | 5/2000 | Burdsall et al. | |
| 6,073,430 A | | 6/2000 | Mullet et al. | |
| 6,119,350 A | * | 9/2000 | Sutliff et al. | 30/276 |
| 6,185,920 B1 | * | 2/2001 | Oxley | 56/14.7 |
| 6,389,786 B1 | * | 5/2002 | Bergsten et al. | 56/17.5 |
| 6,415,515 B1 | * | 7/2002 | Wheeler et al. | 30/208 |
| 6,467,247 B1 | | 10/2002 | Harrison et al. | |
| 6,594,879 B2 | * | 7/2003 | Wheeler et al. | 29/434 |
| 6,729,117 B2 | | 5/2004 | Frazer | |
| 6,912,789 B2 | * | 7/2005 | Price, III | 30/276 |
| 2002/0170179 A1 | * | 11/2002 | Wheeler et al. | 30/208 |
| 2005/0044834 A1 | * | 3/2005 | Appleyard | 56/12.7 |

OTHER PUBLICATIONS

Deere & Company, Mulch Pro A New Concept for Grass Maintenance, Jun. 29, 2004.

* cited by examiner

*Primary Examiner*—Thomas B Will
*Assistant Examiner*—Mai T Nguyen
(74) *Attorney, Agent, or Firm*—Wegman, Hessler & Vanderburg (57) ABSTRACT

A cutting device configured to attach to a spindle of a mower. The cutting device includes at least two pivot-blades and a blade mounting assembly. The blade mounting assembly has an upper retaining plate, a lower retaining plate, and a mounting spacer positioned at least partially between the upper retaining plate and the lower retaining plate, wherein end portions of the pivot-blades are retained between the upper and lower retaining plates.

5 Claims, 6 Drawing Sheets

PIVOT-BLADE CUTTING AND RETAINING MEANS FOR ROTARY MOWERS

CROSS-REFERENCE TO RELATED APPLICATION

This application claims the priority benefit of U.S. Provisional Patent Application No. 60/644,550 filed Jan. 18, 2005.

BACKGROUND OF THE INVENTION

1. Field of Invention

This invention relates to the field of mowers and, more specifically, to a pivot-blade retaining mechanism for such mowers.

2. Description of Related Art

For many years, lawn mower blades were simply bolted on to the bottom of a rotating shaft. As the blades themselves were a little more than straight pieces of sharpened stamped steel, and as all of the forces on the blade were unidirectional, this method of interconnection worked quite well. When the requirements for passing torque to the blade increased, manufacturers adapted varying techniques to include some sort of adapter between the blade and the shaft in order to physically connect the blade. Typically, these methods used a single mounting plate or disc and attached the blade with mounting bolts and retaining nuts.

These methods provide an acceptable solution for rough-cut type grass cutting where durability and impact strength mounting assembly are the main concern. However, these methods provide less than desirable cut-quality for finish-cut operations. The cutting blade would experience significant wobble that resulted in an uneven cut and unprofessional appearance.

SUMMARY OF THE INVENTION

The present invention provides an improved pivot-blade retaining mechanism that provides a stable platform for the cutting blades while remaining cost effective and efficient in design.

In one embodiment, the invention is a cutting device configured to attach to a spindle of a mower. The cutting device includes at least two pivot-blades and a blade mounting assembly. The blade mounting assembly has an upper retaining plate, a lower retaining plate, and a mounting spacer positioned at least partially between the upper retaining plate and the lower retaining plate, wherein end portions of the pivot-blades are retained between the upper and lower retaining plates.

In one embodiment, the upper retaining plate and the lower retaining plate have center mounting apertures that align with a hole in the mounting spacer, and the blade mounting assembly also includes a fastener configured to pass through the mounting apertures and the hole to fasten the cutting device to the associated spindle on the mower.

In one embodiment, the mounting spacer is generally hat shaped, having a rim portion and a center extension, wherein the rim of the mounting spacer has a diameter that is larger than the diameter of the center aperture in the lower retaining plate and the center extension has a diameter that is smaller than the diameter of the center aperture in the upper retaining plate, the mounting spacer being positioned between the upper and lower retaining plates such that the rim of the mounting spacer rests on the lower retaining plate and the center extension passes through the center aperture of the upper retaining plate so that the lower and upper retaining plates are separated by the rim of the mounting spacer.

In one embodiment, each pivot blade is retained between the lower and upper retaining plates with a blade mounting bolt and a nut, wherein the blade mounting bolt passes through apertures in the lower and upper retaining plates and an aperture in the mounting end of the pivot blade. The mounting assembly further includes at least one pivot-blade spacer, the pivot-blade spacer being received within the aperture in the mounting end of the pivot-blade and wherein the pivot-blade spacer has a thickness greater than the thickness of a portion of the pivot-blade adjacent the aperture receiving the pivot-blade spacer, and wherein the blade mounting bolt is inserted through the mounting holes in the lower and upper retaining plates and through the pivot-blade spacer located in the aperture of the pivot-blade.

In another embodiment, the invention is a mower for use in cutting vegetation. The mower includes a chassis, an engine mounted to the chassis, a mower deck comprising at least one spindle rotated by the engine, and a rotary cutting device attach to the spindle. The cutting device includes at least two pivot-blades and a blade mounting assembly. The blade mounting assembly includes an upper retaining plate, a lower retaining plate, and a mounting spacer positioned at least partially between the upper retaining plate and the lower retaining plate, wherein end portions of the pivot-blades are retained between the upper and lower retaining plates.

In another embodiment, the invention is a method for attaching pivot-blades to a mower. The method includes placing a mounting spacer between an upper retaining plate and a lower retaining plate, wherein the mounting spacer is generally hat shaped, having a rim portion and a center extension, wherein the rim of the mounting spacer has a diameter that is larger than the diameter of the center aperture in the lower retaining plate and the center extension has a diameter that is smaller than the diameter of the center aperture in the upper retaining plate, such that the rim of the mounting spacer rests on the lower retaining plate and the center extension passes through the center aperture of the upper retaining plate so that the lower and upper retaining plates are separated by the rim of the mounting spacer. The method further includes placing end portions of at least two pivot-blades between the upper and lower retaining plates and retaining each pivot-blade between the lower and upper retaining plates with a blade mounting bolt and a nut, wherein the blade mounting bolt passes through apertures in the lower and upper retaining plates and an aperture in the mounting end of the pivot blade. The method further includes aligning center mounting apertures in the upper retaining plate and the lower retaining plate with a hole in the mounting spacer and inserting a fastener through the mounting apertures and the hole to fasten the cutting device to a spindle on the mower. In another embodiment, the invention further includes placing the pivot-blades such that a sail portion on the back edge of at least one pivot-blade faces in a downward direction and sail portion on the back edge of at least one pivot-blade faces in an upward direction to increased turbulence is created within a mower deck chamber for mulching operations.

These and other features and advantages of this invention are described in, or are apparent from, the following detailed description of various exemplary embodiments of the systems and methods according to this invention.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
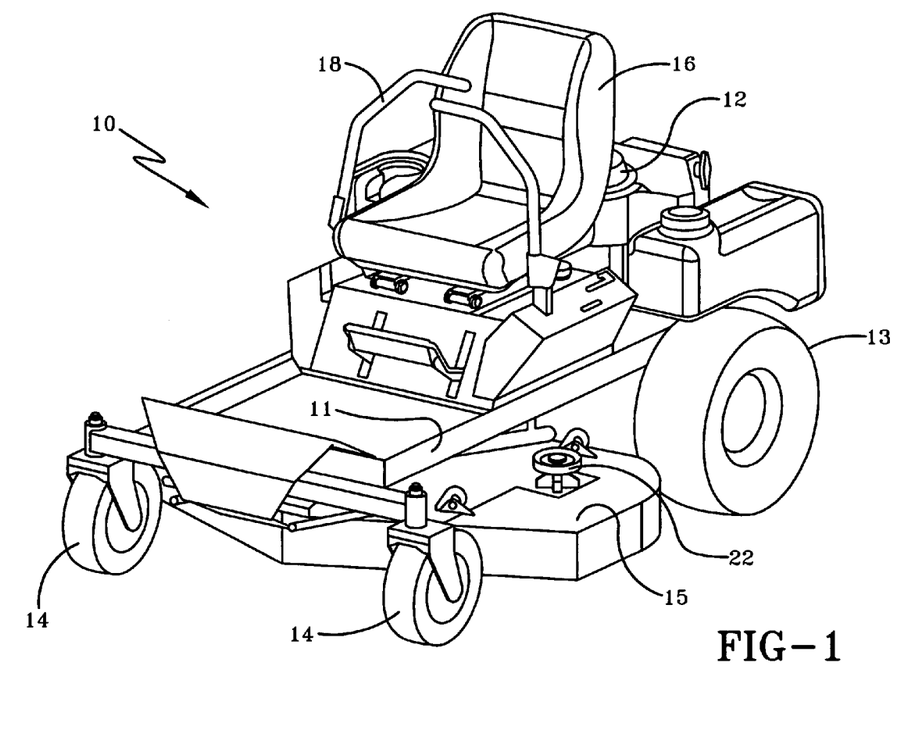
FIG. 1 is a perspective view of a mower on which a pivot-blade cutting and retaining means according to the invention may be used.

Referring to the drawings and more specifically to FIG. 1, a riding mower 10 for cutting grasses and other vegetation is illustrated. The riding mower 10 is built on a chassis 11 which supports an engine 12, a pair of drive wheels 13, and a pair of caster mounted follower wheels 14. A mower deck 15 is adjustably suspended from the chassis 11 of the mower 10 through vertical height adjustment rods (not shown) between the drive wheels 13 and castor wheels 14 using any means known to one skilled in the art. The riding mower 10 also includes a seat 16 for an operator and a pair of direction and speed control levers 18 that are used to control the direction and the speed of revolution of the drive wheels 13 to thereby control the speed and direction of the mower 10. Mowers 10 of this type are well-known in the grass mowing art and are conventionally referred to as "zero turn" mowers. However, the invention described herein may equally be used with other types of riding or walk-behind mowers.

Figure 2:
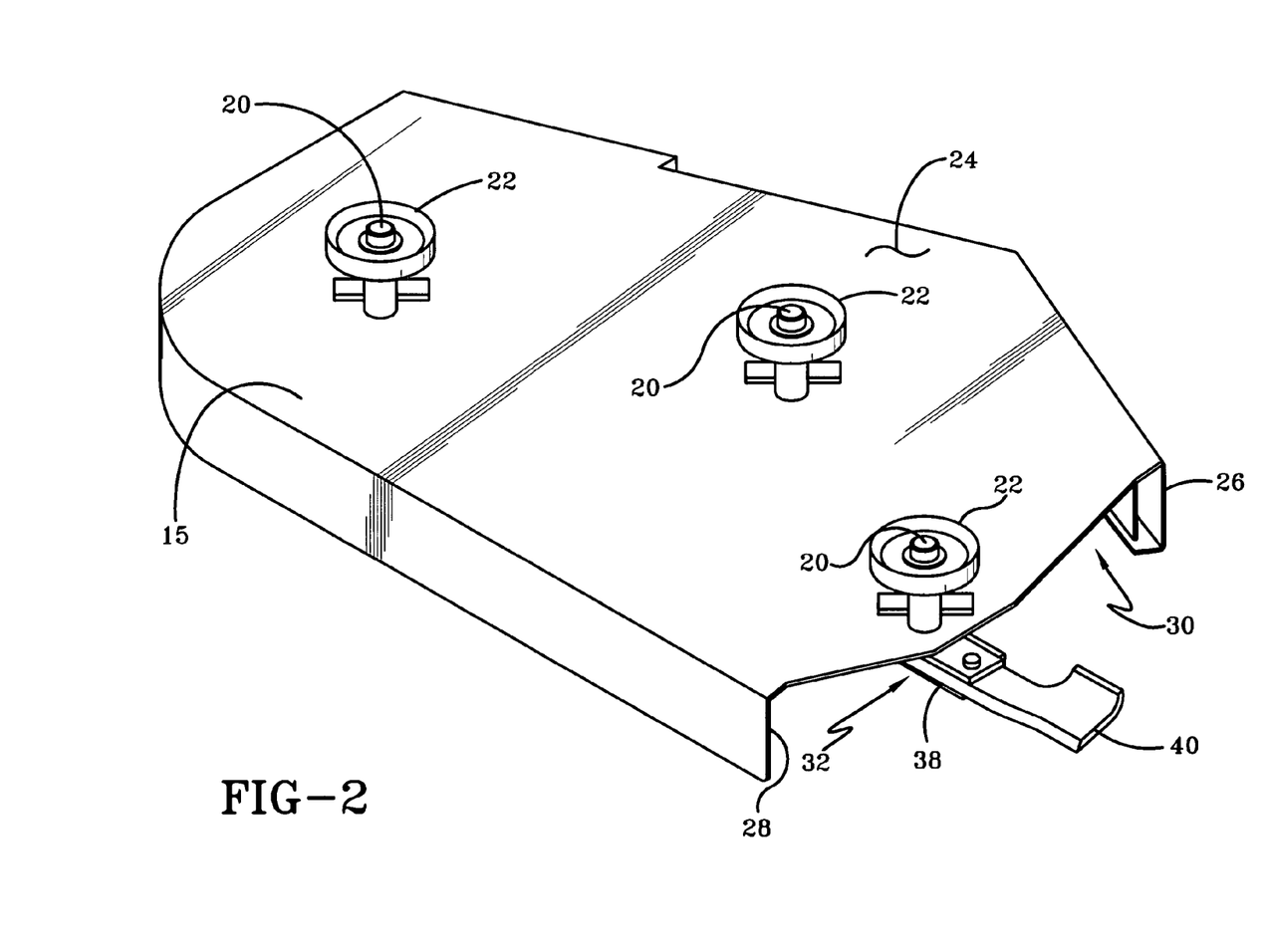
FIG. 2 is a cutaway front right perspective view mower deck illustrating the pivot-blade.

Referring now to FIG. 2, power to the mower deck 15 is provided through a pulley (not shown) which in turn drives cutting blade spindles 20 through pulleys 22 and a rubber V-belt (not shown). The mowing deck 15 is fabricated with a top panel 24 surrounded by a front skirt 26 and a rear skirt 28. The cutaway view of the deck illustrates interconnected blade chambers 30 formed in the underside the mower deck 15. A grass cutting device, indicated generally at 32, is mounted on each of the spindles 20. The illustrated mower deck 15 has three spindles 20, each mounting a grass cutting device 32 (only one of which is shown), however, it is to be understood that the mower deck may have any number of spindles, such as one, two, or more, without departing from the scope of the invention. As mower decks 15 are well understood by those skilled in the art, additional detail pertaining to the mower deck need not be provided herein.

Figure 3A:
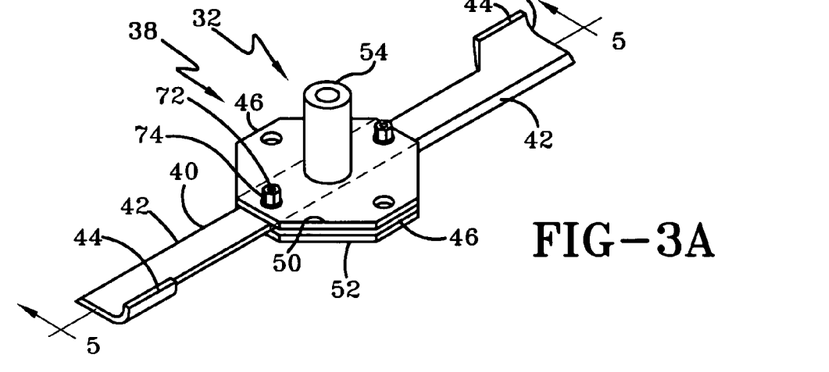
FIG. 3A is a perspective view of the pivot-blade mounting assembly.
Figure 3B:
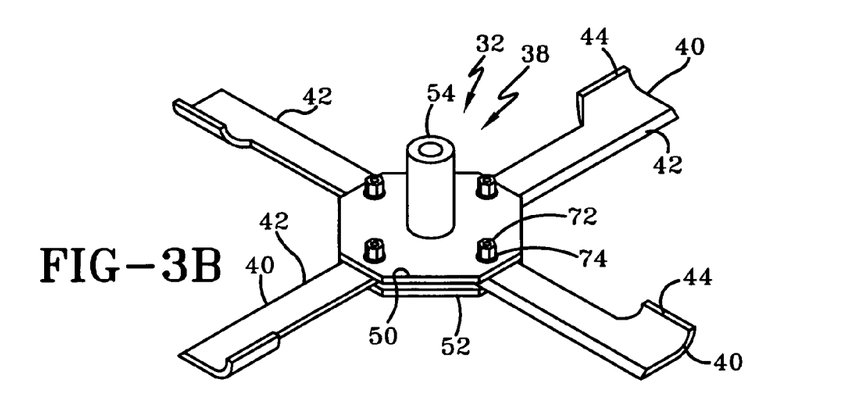
FIG. 3B is a perspective view of the pivot-blade mounting assembly of FIG. 3A with the pivot-blades in an alternate configuration.
Figure 3C:
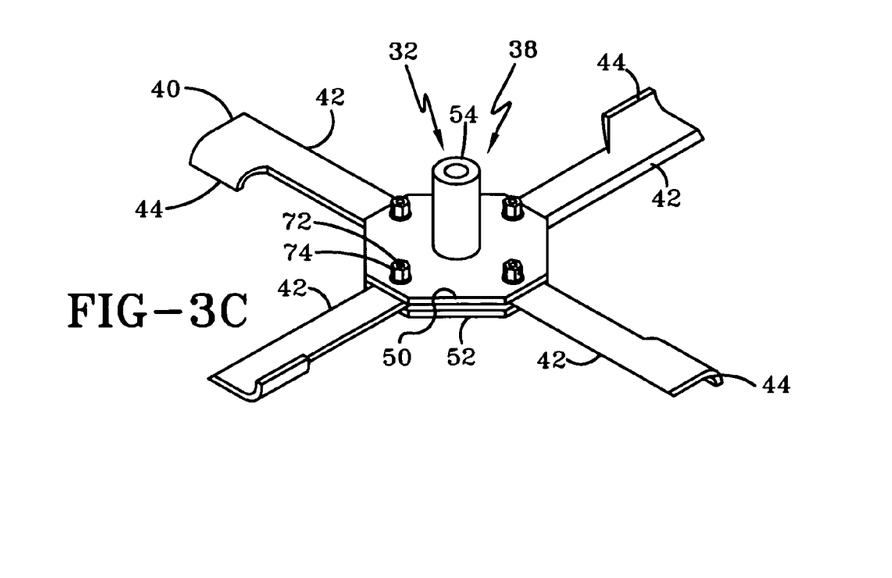
FIG. 3C is a perspective view of the pivot-blade mounting assembly of FIG. 3A with the pivot-blades in an alternate configuration.
Figure 4:
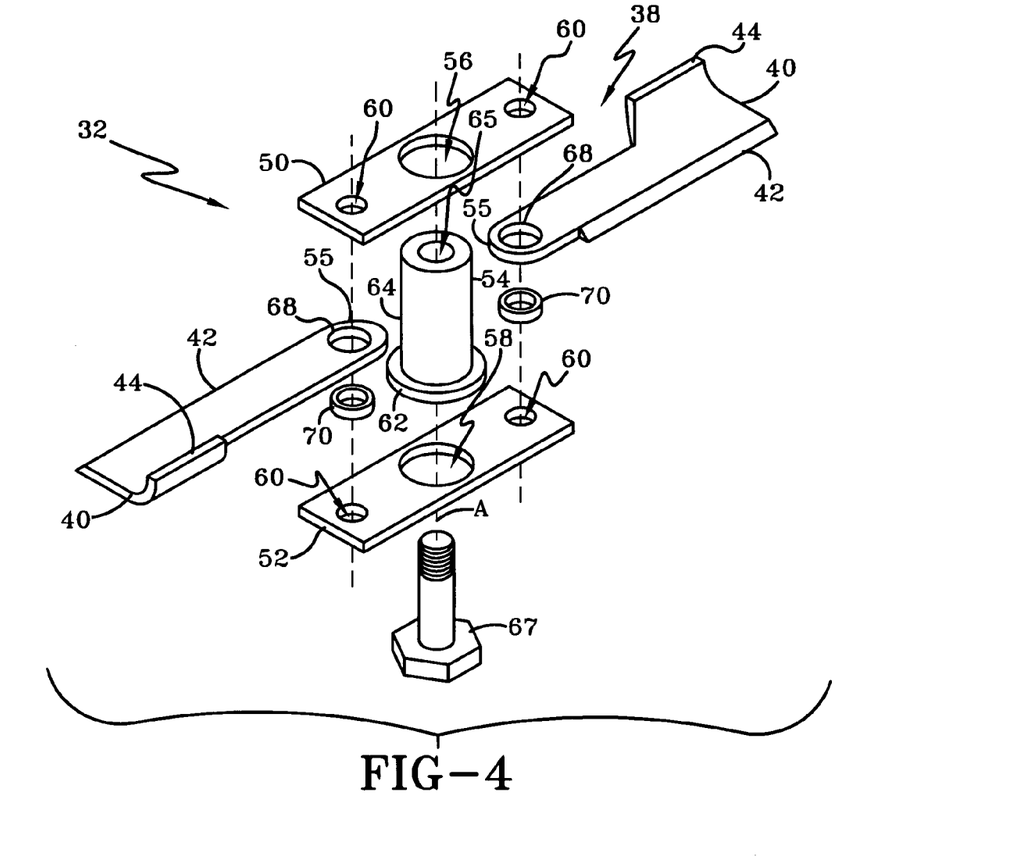
FIG. 4 is an exploded perspective view of the pivot-blade mounting assembly.
Figure 6A:
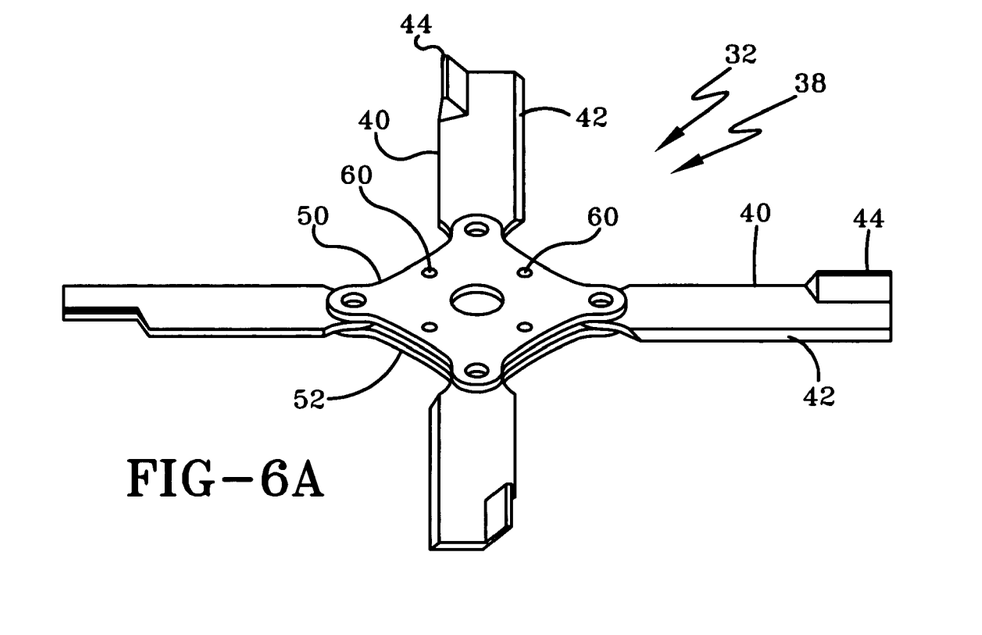
FIG. 6A is a perspective view of another embodiment of the pivot-blade mounting assembly.
Figure 6B:
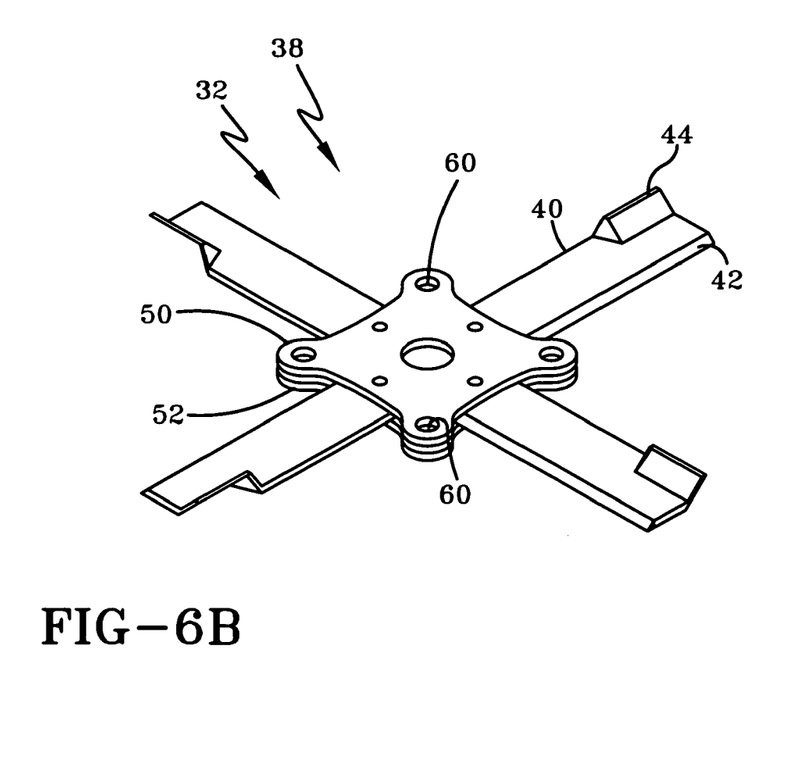
FIG. 6B is a perspective view of the pivot-blade mounting assembly of FIG. 6A with the pivot-blades in an alternate configuration.

Turning now to FIG. 3A, one embodiment of the grass cutting device 32 according to the invention is illustrated. The illustrated grass cutting device 32 comprises a pivot-blade mounting assembly 38 and two pivot-blades 40. The pivot-blade mounting assembly 38 fixedly attaches to the spindle 20 (FIG. 2) so that rotational movement of the spindle is transmitted into rotational movement of the pivot-blades 40. The illustrated pivot-blade mounting assembly 38 is configured to retain two or more pivot-blades 40 such that each pivot-blade radiates generally outward from the center of the mounting assembly so as to provide a cutting surface 42 on a front edge of the pivot-blade 40 for cutting grass and other vegetation. On the back edge of pivot-blades 40 are sails 44, which lift and rotate the air within the blade chambers 30 (FIG. 2), thereby creating suction forces along the periphery of the blade chambers. In one embodiment, the blade mounting assembly 38 has an octagon shape as illustrated in FIGS. 3A-C and retains up to four pivot-blades 40 as will be more fully set forth below. The blade mounting assembly 38 can also have other shapes, such as a rectangular shape that is configured to retain two pivot-blades 40 as illustrated in FIG. 4, or a star shape that is configured to retain up to four pivot-blades 40 as illustrated in FIGS. 6A and 6B. Additionally, the blade mounting assembly 38 may have other geometric shapes, and can retain other numbers of pivot-blades 40, such as one, three, five, or more, using sound engineering judgment without departing from the scope of the invention.

The number of pivot-blades 40 to be retained by the blade mounting assembly 38 is desirably selected based on the intended use of the mower 10. For example, in FIG. 3A, the blade mounting assembly 38 has two pivot-blades 40, but has "open" spots at 46 where an additional two pivot-blades 40 could be retained. FIGS. 3B and 3C illustrate the same blade mounting assembly 38 of FIG. 3A, but now the blade mounting assembly is illustrated retaining four pivot-blades 40 such that there are no additional open spots. By way of explanation and not to limit the scope of the patent, additional pivot-blades are desirable and may be added to the blade mounting assembly 38 as illustrated by the example depicted in FIG. 3B when the grasses, leaves, and/or debris being cut are intended to be collected in a material collection means. The additional pivot-blades 40 provide extra lift and air/debris flow to elevate the grasses into the blade chamber 30 and to provide increased air pressures and centrifugal forces to encourage the suspended material to exit the deck 15 and enter a material collection means (not shown) carried by the mower 10. Furthermore, it is also desirable to add additional mulching pivot-blades 40 to the blade mounting assembly 38 for mulching operations. When mulching pivot-blades 40 are installed, it is desirable to install some of the pivot-blades with sails 44 that face in a downward direction and some of the mulching pivot-blades with sails 55 that face in an upward direction as illustrated in FIG. 3C so that increased turbulence is created within the mower deck chambers 30. Increased turbulence is created within the mower deck chambers 30 by the alternating mounted pivot-blades 40, thereby creating upward lift forces and downward lift forces as the blades rotate and cut the grasses or leaves. The additional pivot-blades 40 also provide an increased number of cutting surfaces 42 that secondarily cut the grasses and leaves thereby making the cut particles smaller for easier assimilation into the uncut grasses.

As best seen in the exploded view of FIG. 4, the blade mounting assembly 38 includes an upper retaining plate 50 and a lower retaining plate 52 separated by a mounting spacer 54. An end portion 55 of each pivot-blade 40 is received between the upper and lower retaining plates 50, 52, and the retaining plates are bolted or otherwise clamped together in order to securely retain the blades as will be set forth in more detail below. The upper retaining plate 50 and the lower retaining plate 52 have center mounting apertures 56, 58 respectively, and a plurality of blade mounting apertures 60. The upper and lower retaining plates 50, 52 are manufactured of a suitable durable material such as steel, and desirably have a thickness between about 0.15 inches and about 0.5 inches. As illustrated in FIG. 4, the mounting spacer 54 is generally hat shaped, with a rim portion 62 and a center extension 64. The mounting spacer 54 has a hole 65 there through generally along its longitudinal axis A. A mounting fastener 67 is inserted through the aperture 58 in the lower retaining plate 52, the hole 65 in the mounting spacer 54, and the aperture 56 in the upper retaining plate 50, and is then received by a hole (not shown) in the spindle 20 (FIG. 2) to attach the blade mounting assembly 38 to the spindle 20. Preferably the mounting fastener 67 is a threaded bolt to be threaded into the spindle 20.

Figure 5:
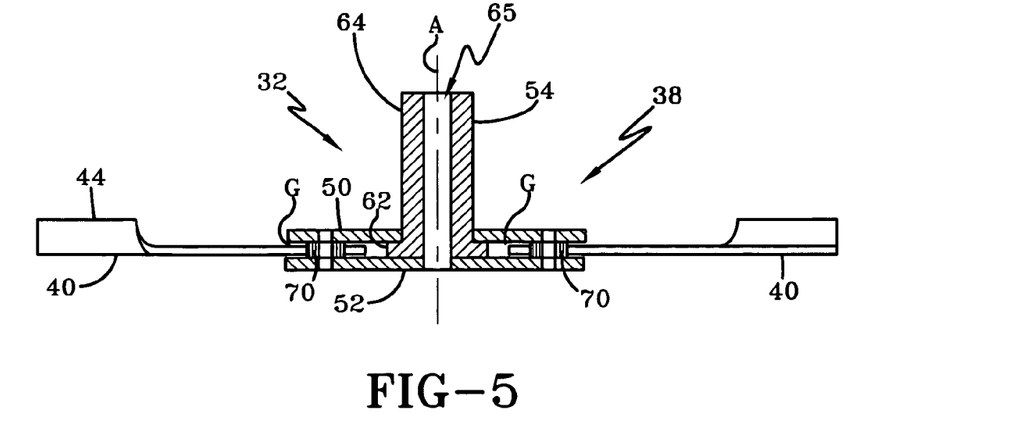
FIG. 5 is a sectional view of the pivot-blade mounting assembly taken along line 5-5 of FIG. 3A.

The rim 62 of the mounting spacer 54 has a diameter that is larger than the diameter of the center aperture 58 in the lower retaining plate 52 and the extension 64 has a diameter that is smaller than the diameter of the center aperture 56 in the upper retaining plate 50. Thus, in the assembled condition, the mounting spacer 54 is placed between the upper and lower retaining plates 50, 52 such that the rim 62 of the mounting spacer 54 rests on the lower retaining plate 52 and the center extension 64 passes through the center aperture 56 of the upper retaining plate 50. As best seen in FIG. 5, the upper and lower retaining plates 50, 52 are separated by a distance equal to the height of the rim 62 of the mounting spacer 54. Desirably, the rim 62 has a height approximately 0.002 inches to 0.010 inches taller than the thickness of the pivot blade. The center extension 64 of the mounting spacer 54 is received by the spindle 20 (FIG. 2) and the center hole 65 aligns with a receiving hole (not shown) in the spindle 20 to mount the mounting assembly 38 to the spindle 20.

As best seen in FIG. 4, the pivot-blade 40 contains an aperture 68 near the mounting end 55 thereof. In one embodiment, the aperture 68 is sized so as to receive a pivot-blade spacer 70 within the aperture. The mounting end 55 of the pivot-blade 40 is placed between the upper and lower retaining plates 50, 52 such that the aperture 68 in the pivot-blade aligns with the mounting holes 60 in the upper and lower retaining plates 50, 52. Bolts 72 (FIG. 3A) are inserted through the mounting holes 60 in the lower and upper retaining plates 52, 50 and through the pivot-blade spacer 70 positioned within the aperture 68 of the pivot-blade 40 and secured with a locking nut 74. The embodiment of FIG. 4 has two apertures 60 in the upper and lower retaining plates 50, 52 and is configured to receive up to two pivot-blades 40. The embodiment shown in FIGS. 3A-C has four apertures 60 in the upper and lower retaining plates 50, 52 and is configured to receive up to four pivot-blades 40. The embodiment shown in FIGS. 6A-B has eight apertures 60 in the upper and lower retaining plates 50, 52 and is desirably configured to receive up to four pivot-blades 40 in two desirable configurations as shown respectively in FIGS. 6A and 6B.

In one embodiment, the pivot-blade spacers 70 separate the upper and lower retaining plates 50, 52 in such manner that a clearance gap G is provided between the pivot-blades 40 and the upper and lower retaining plates 50, 52 as best seen in FIG. 5. Desirably the clearance gap ranges from between about 0.002 and about 0.010 inches, and in one embodiment is about 0.005 inches. The pivot-blade spacers 70 and the rim 62 portion of the blade assembly mounting spacer 54 are slightly taller than the thickness of the pivot-blades 40 so as to provide the desired clearance gap G between the upper and lower retaining plates 50, 52 and the pivot-blades 40. Thus, the pivot-blades 40 are retained between the upper and lower retaining plates 50, 52 by means of the bolts 72 with pivot-blade spacers 70. The bolts 72 counteract the centrifugal forces generated by the rotating pivot-blades 40. The pivot-blade 40 is configured such that the center-of-mass of the blade is not located on the centerline of the blade creating a rotational moment that counteracts the drag on the rotating blade 40.

Figure 7:
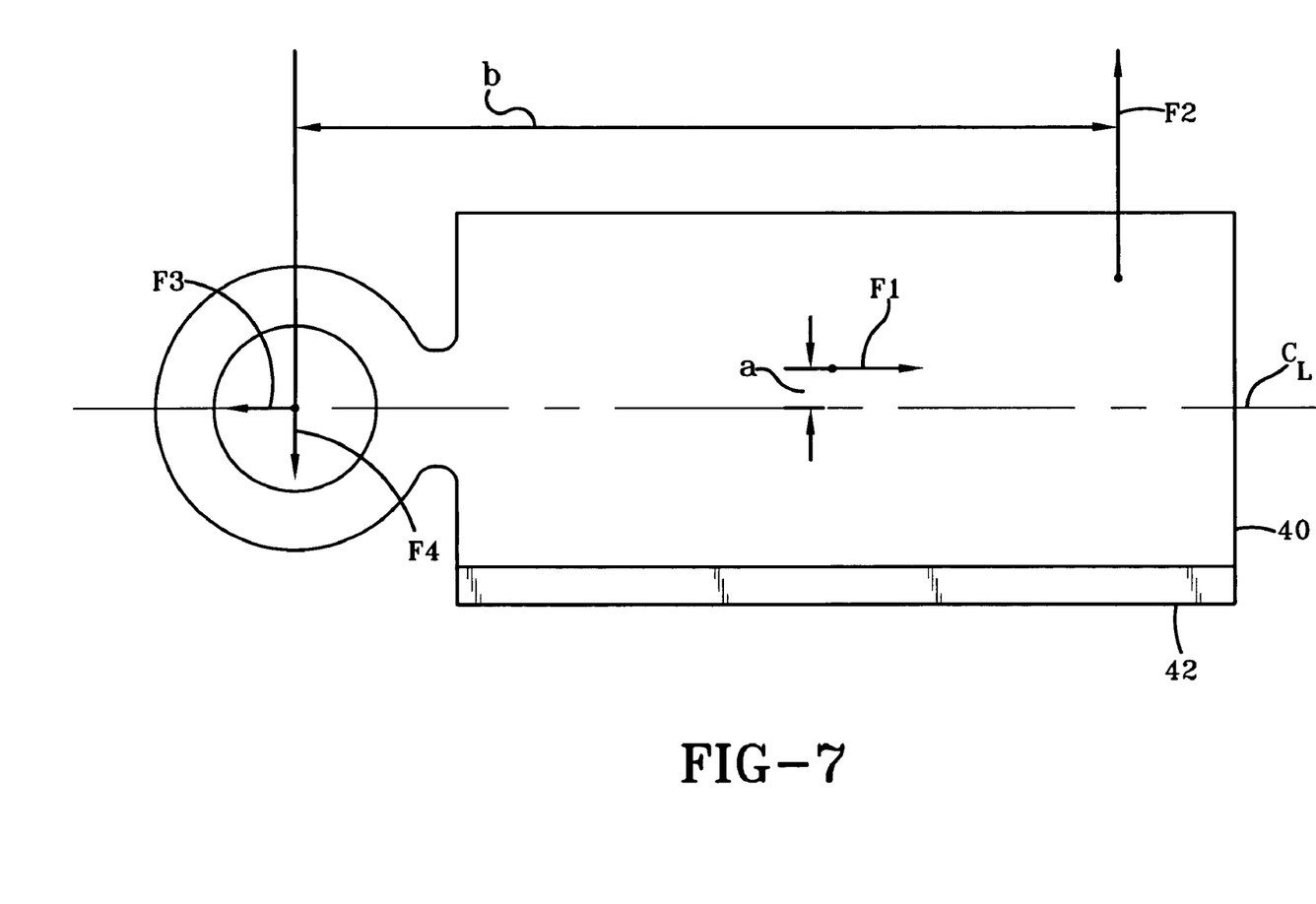
FIG. 7 is a plan view of the pivot blade showing forces acting on the pivot blade.

Referring now to FIG. 7, in one embodiment, the pivot-blade 40 is configured such that the aperture 68 used to receive the pivot-blade spacers 70 are off-centered such that the center-of-mass of the blade 40 creates a rotational moment that counteracts the drag on the rotating blade 40 caused by the air-lift of the sail 44 and other resistances that may be encountered such as the reaction of the pivot-blade to the grass being cut. During operation, a moment force is generated to pivot the blade forward toward the cutting edge. Initially, the product of the force generated by the mass of the pivot blade 40 through its center of mass (F1) multiplied by the distance that the center of mass of the blade is offset from the blade center (a) is greater than the product of the drag force generated by the resistance of the blade moving through the air and grasses (F2) multiplied by the distance that the drag force acts through (b) (e.g., F1×a>F2×b). This causes the pivot blade 40 to pivot forward, toward the cutting edge 42, causing the distance that the center of mass of the blade is offset from the blade center to decrease, until the two products are equal (e.g., F1×a=F2×b). A force (F3) resists the centrifugal forces generated by the pivot blade 40 mass and a force (F4) acts on the blade by the pivot spacer, internal to the blade to resist the drag caused by the blade moving through the air and grass. As the pivot blade 40 is sharpened, the center of mass moves away from the sharpened edge, and thus, the distance that the center of mass of the blade is offset from the blade center increases. This creates an enhanced condition.

In an alternate embodiment, the bolts 72 have a shoulder portion (not shown) that are inserted through the holes 60 in the upper and lower retaining plates 50, 52 and the hole 68 in the pivot-blade 40. The bolts 72 with the shoulder portion are used in place of the pivot-blade spacer 70. The locking nut 74 is threaded onto the shoulder bolt 72 such that the nut contacts the non-threaded shoulder portion of the shoulder bolt 72. The height of the un-threaded shoulder portion of the shoulder bolt 72 is desirably slightly less than the combined thickness of the space created by the rim 62 portion of the mounting spacer 54 and the upper and the lower retaining plates 50, 52. This provides a clamping force applied to the upper retaining plate 50, the lower retaining plate 52, and the rim 62 portion of the mounting spacer 54 by the shoulder bolt 72 and the locking nut 74.

The above-described assembly of mounting pivot-blades 40 in the blade mounting assembly 38 enables the blades to be more stable and provide a higher quality of cut than prior art methods of mounting pivot-blades. Additionally, the mounting assembly 38 provides greater flexibility in choosing different pivot-blade configurations. As briefly discussed above, the mounting assembly 38 can be used to hold a varying number of pivot-blades 40 depending on the intended use of the mower 10. As shown in the illustrations in FIGS. 3A-C, the mounting assembly 38 can be used to mount a different numbers of pivot-blades 40. Additionally, traditional or mulching pivot-blades 40 can be used to increase the efficiency of the cutting device 32. Also, the mounting assembly 38 can be used to vary the positioning of the pivot-blades. For example, the pivot-blade 40 configuration illustrated in FIG. 6A can be used to mount the pivot-blades in the mounting assembly 38 for use on a mower 10 having a larger mower deck 15 (e.g., 60 inch or 72 inch deck), and the pivot-blade 40 configuration illustrated in FIG. 6B can be used to mount the pivot-blades in the mounting assembly 38 for use on a mower 10 having a smaller mower deck 15 (e.g., 48 inch deck).

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A cutting device for use with a mower and configured to attach to a spindle of the mower for cutting vegetation, the cutting device comprising:
   a plurality of pivot-blades, each pivot-blade having an aperture in a mounting end thereof, wherein the center of mass of the blade is offset from a longitudinal axis of the blade passing through the center of the aperture in the mounting end;
   a pivot-blade mounting assembly, the pivot-blade mounting assembly comprising:
      an upper retaining plate having a center mounting aperture and at least two blade mounting apertures therethrough;
      a lower retaining plate having a center mounting aperture and at least two blade mounting apertures therethrough;
      a mounting spacer positioned at least partially between said upper retaining plate and said lower retaining plate, the mounting spacer having a rim portion and a center extension such that it has a generally hat shape with a hole through said rim portion and center extension, wherein the rim portion has a diameter that is larger than the diameter of the center apertures in the lower and upper retaining plates, and the center extension has a diameter that is smaller than the diameter of the center aperture in the upper retaining plate, said mounting spacer being positioned between the upper and lower retaining plates such that the rim portion of the mounting spacer is between the lower and upper retaining plates and the center extension is received through the center aperture of the upper retaining plate so that the lower and upper retaining plates are separated by said rim portion of the mounting spacer;
      a fastener configured to pass through said mounting apertures and said hole to fasten the cutting device to the associated spindle on the mower;
      a plurality of blade mounting bolts and corresponding nuts, wherein one of the blade mounting bolts passes through one of the blade mounting apertures in each of the lower and upper retaining plates and the aperture in the mounting end of one of the pivot-blades to retain said pivot-blade between the lower and upper retaining plates when secured with its corresponding nut; and
      a plurality of pivot-blade spacers, wherein each one of said pivot-blade spacers is received within the aperture in the mounting end of each one of the pivot-blades, said pivot-blade spacers having a diameter that is less than the diameter of the aperture in the pivot-blade and a thickness greater than the thickness of the pivot-blade adjacent the aperture such that the pivot-blade spacer contacts a downward facing surface of the upper retaining plate and an upward facing surface of the lower retaining plate such that it separates the upper and lower retaining plates and forms a clearance gap G between the pivot-blade and the upper and lower retaining plates, thereby permitting the pivot blades to pivot as the cutting device rotates during cutting operations;
      wherein a rotational moment acting on each pivot blade created by the offset between the center of mass of the blade and the center of the aperture in the mounting end counteracts resistance encountered by the rotating blade.

2. The cutting device of claim 1 wherein each blade mounting bolt is inserted through the blade mounting apertures in the lower and upper retaining plates and through the pivot-blade spacer located in the aperture of the pivot-blade.

3. The cutting device of claim 2 wherein the pivot-blade spacer separates the upper and lower retaining plates in such manner that the clearance gap G ranges from between about 0.002 inches and about 0.020 inches.

4. A method of attaching pivot-blades to a mower, said method comprising:
   placing a mounting spacer between an upper retaining plate and a lower retaining plate, wherein the mounting spacer is generally hat shaped, having a rim portion and a center extension, wherein the rim of the mounting spacer has a diameter that is larger than the diameter of the center aperture in the lower retaining plate and the center extension has a diameter that is smaller than the diameter of the center aperture in the upper retaining plate, such that the rim of the mounting spacer rests on the lower retaining plate and the center extension passes through the center aperture of the upper retaining plate so that the lower and upper retaining plates are separated by the rim of the mounting spacer;
   placing end portions of at least two pivot-blades between the upper and lower retaining plates, wherein the center of mass of each of the blades is offset from a longitudinal axis of the blade passing through the center of the aperture in its mounting end;
   inserting at least one pivot-blade spacer within the aperture in the mounting end of the pivot-blade, wherein the pivot-blade spacer has a thickness greater than the thickness of a portion of the pivot-blade adjacent the aperture receiving said pivot-blade spacer, and wherein said blade mounting bolt is inserted through the mounting holes in the lower and upper retaining plates and through the pivot-blade spacer located in the aperture of the pivot-blade;
   retaining each pivot-blade between the lower and upper retaining plates with a blade mounting bolt and a nut, wherein the blade mounting bolt passes through apertures in the lower and upper retaining plates and an aperture in the mounting end of the pivot-blade such that the pivot-blade spacer contacts a downward facing surface of the upper retaining plate and an upward facing surface of the lower retaining plate such that it separates the upper and lower retaining plates and forms a clearance gap G between the pivot-blade and the upper and lower retaining plates, thereby permitting the pivot blades to pivot as the cutting device rotates during cutting operations;

aligning center mounting apertures in the upper retaining plate and the lower retaining plate with a hole in the mounting spacer; and inserting a fastener through said mounting apertures and said hole to fasten the cutting device to a spindle on the mower.

5. The method of claim 4 further comprising placing the pivot-blades such that a sail portion on the back edge of at least one pivot-blade faces in a downward direction and sail portion on the back edge of at least one pivot-blade faces in an upward direction to increased turbulence is created within a mower deck chamber for mulching operations.

* * * * *